United States Patent [19]

Stephens

[11] Patent Number: 5,693,134
[45] Date of Patent: Dec. 2, 1997

[54] GRAY INTERFERENCE PIGMENT AND PROCESS FOR PRODUCING THE SAME

[75] Inventor: Alfred Stephens, Bloomingdale, Ga.

[73] Assignee: Merck Patent Gesellschaft mit beschrankter Haftung, Darmstadt, Germany

[21] Appl. No.: 365,931

[22] Filed: Dec. 29, 1994

[51] Int. Cl.$^6$ .................. C04B 14/00; C04B 14/20; C09C 1/36; C09D 5/36

[52] U.S. Cl. ............... 106/415; 106/417; 106/436; 106/440; 106/441; 106/480; 106/DIG. 3; 501/14; 428/357; 428/363; 428/403; 428/404; 427/214; 427/218; 427/217; 427/419.2; 427/419.3

[58] Field of Search ................ 106/415, 436, 106/440, 480, 903, 441, 417, DIG. 3; 428/357, 363, 402, 403, 404; 427/212, 214, 215, 218, 217, 419.2, 419.3; 501/17, 14

[56] References Cited

U.S. PATENT DOCUMENTS

| | | | |
|---|---|---|---|
| 3,087,828 | 4/1963 | Linton | 106/417 |
| 4,565,581 | 1/1986 | Bernhard | 106/417 |
| 5,039,343 | 8/1991 | Umeda et al. | 106/404 |
| 5,080,718 | 1/1992 | Sullivan et al. | 106/480 |
| 5,137,575 | 8/1992 | Yasuki et al. | 106/440 |
| 5,250,112 | 10/1993 | Wussow et al. | 106/480 |
| 5,266,107 | 11/1993 | Hoffman | 106/415 |
| 5,308,394 | 5/1994 | Minohara et al. | 106/417 |

FOREIGN PATENT DOCUMENTS

| | | |
|---|---|---|
| 4-249584 A | 9/1992 | Japan. |
| 5-271569 A | 10/1993 | Japan. |

*Primary Examiner*—Michael Marcheschi
*Attorney, Agent, or Firm*—Millen, White, Zelano, & Branigan, P.C.

[57] ABSTRACT

An interference pigment comprising a platelet-shaped substrate coated with titanium dioxide and additionally oxidic compounds of copper and manganese, whereby the pigment powder color is dark gray.

13 Claims, No Drawings

GRAY INTERFERENCE PIGMENT AND PROCESS FOR PRODUCING THE SAME

The present invention relates to interference pigments having a dark gray color and excellent brightness. The pigments are based on a platelet-like, i.e., platelet-shaped, substrate coated with titanium dioxide and additionally oxidic compounds of copper and manganese. The invention also relates to a process for producing the same.

BACKGROUND OF THE INVENTION

Metal flakes are used as pigments in paint for outdoor use, especially for the exterior coating of cars. Aluminum flakes, for example, are used as pigment to obtain a silver-gray color. However, metals, especially aluminum, are disadvantageous in aqueous lacquer because they are reactive in aqueous systems. Specifically, contact of these metals with water generates dangerous quantities of hydrogen. It is known that paints of this type also undergo changes in appearance when exposed to various weather conditions. Therefore, it is difficult to obtain coatings with reproducible attributes.

In order to avoid these disadvantages, the metal flakes can be coated with polymers as disclosed in EP-A-O 393 579 (corresponding to U.S. Pat. No. 5,039,343). However, if metal pigments are mixed with pigments having mica flakes as a substrate for water-based varnish, the coating can be destroyed by the sharp edges of the mica flakes, and hydrogen may be generated. Therefore, there exists a need for the replacement of conventional metallic pigments in these and other applications.

Furthermore, it is known that special color effects can be achieved by incorporating carbon black into certain pigments. But often the precipitation of carbon black is not quantitative and some of the carbon black precipitates onto the substrate material in an agglomerated form, with the result that the resulting pigment will not have good covering power. A further disadvantage is that the carbon black incorporated in the pigments will often bleed out when the coated pigment is suspended in an organic solvent of the type used for preparing coating systems.

SUMMARY OF THE INVENTION

Accordingly, there was a great demand for dark gray powder pigments, which may optionally have interference color and which can be used in stylings with dark colors, such as in exterior coatings for automobiles, in order to eliminate the necessity of carbon black, which makes formulating difficult, and may replace aluminum flakes in special formulations.

Upon further study of the specification and appended claims, further objects and advantages of this invention will become apparent to those skilled in the art.

Surprisingly, it has now been found that dark gray powder interference pigments can be generated by forming a black mixed metal oxide, $Cu_xMn_{3-x}O_4$ (x=1.4, 1.5), on the surface of a $TiO_2$ coated platelet-shaped substrate. The dark gray of the inventive pigments dramatically reduces the appearance of the complement to the interference. Further, the inventive pigments are characterized by very clean colors and an excellent hiding power. They are characterized, for example, by the formation of heterobimetallic oxides having x-ray diffraction patterns significantly different than the diffraction patterns of any of the singular oxides CuO, MnO, $Mn_2O$, $Mn_3O_4$, etc.

The use of the above mentioned metal oxide components for the coating of platelet-shaped substrates is known. The JP 05-271,569 patent describes black pearl pigments which are based on $TiO_2$/mica pigments coated with oxides of copper and manganese but also require chromium oxide. Furthermore, it is known from JP 04-249,584 to increase the resistance of ultraviolet discoloration by precipitation of at least one colored metal oxide of Co, Fe, Ni, Cu and/or Mn onto mica or $TiO_2$/mica and/or a second layer of oxides of Ce and Sb.

Accordingly, the invention relates to dark gray powder pigments with optional interference colors comprising a platelet-shaped substrate with titanium dioxide and an oxidic compound of copper and manganese.

The invention also relates to a process for the preparation of the interference pigments, in which the metal oxide, $Cu_xMn_{3-x}O_4$ (x=1.4 or 1.5), is formed on a $TiO_2$ coated platelet-shaped substrate, characterized in that water-soluble copper and manganese salts are added to an aqueous suspension of the platelet-shaped substrate in such a manner that the water-containing oxides are generated on and within the $TiO_2$ coated substrate and in that the pigment thus coated is separated off, washed, dried and calcined to form the final product.

Any customary platelet-shaped substrates can be used for the process, in particular layered silicates and oxides or materials coated with oxides, since they contain reactive —OH groups on the surface. Examples of these are, on the one hand, mica, talc, clay, kaolin, sericite, or other comparable minerals, on the other hand, they also include platelet-shaped iron oxide, bismuth oxychloride and aluminum platelets or aluminum platelets coated with metal oxide. Mica coatings with colored or colorless metal oxides, such as $TiO_2$, $Fe_2O_3$, $SnO_2$, $Cr_2O_3$, ZnO and other metal oxides, by themselves or in a mixture in a uniform layer or in subsequent layers, for example, as a base coat separate from the heterobimetallic oxide mixture of $Cu_xMn_{3-x}O_4$ and $TiO_2$, are particularly suitable for recoating. These so-called pearl luster pigments are disclosed, for example, in German Patent Specifications and Patent Applications 1,467,468, 1,959,998, 2,009,566, 2,214,545, 2,215,191, 2,244,298, 2,313,331, 2,522,572, 3,137,808, 3,137,809, 3,151,354, 3,151,355, 3,211,602 and 3,235,107 and commercially available, for example, under the trade name IRIODIN® for pearl luster pigments from E. Merck, Darmstadt.

Especially preferred platelet-shaped substrates are mica, synthetic platelet-shaped substrate such as synthetic mica, glass flakes, ceramic flakes, $SiO_2$ flakes and pearl luster pigments. In the invention, the platelet-shaped substrate preferably has a diameter from 1–200 µm, more preferably 5–60 µm and a preferred thickness of from 0.1–10 µm, more preferably from 0.5–1.5 µm.

The process according to the invention is readily conducted. The preparation takes place by mixing the platelet-shaped substrates present in aqueous suspension with the coating reagent. The copper and manganese compounds, e.g., in the form of salts, can be metered into the suspension in succession or simultaneously. It is preferred first to add the manganese salt to the aqueous suspension containing the platelet-shaped substrates at the same time as the addition of the titanium salt and then to add the copper salt dissolved in water or in solid form. Suitable metal salts are, in particular, halides, nitrates and sulfates, preferably the chlorides. The precipitation of the copper and manganese oxides, which are deposited on the platelet-shaped substrates dispersed in the suspension, is effected by suitable pH and temperature conditions.

The color producing compounds, including the copper and manganese, as solids or solutions can be added either in succession or simultaneously during the coating with the titanium salt or after the coating has reached the desired color endpoint. It is preferable to add the manganese salt simultaneous to the titanium salt to ensure the best rutile $TiO_2$ formation and color generation in addition to the lowest possible calcination temperature.

A preferred method of preparation includes a $SnO_2$ layer prior to the hydrous oxides, i.e., the titanium and copper-manganese oxides, coating to facilitate rutile $TiO_2$ generation. The presence of $SnO_2$ markedly stabilized the pigment to higher calcination temperatures thereby allowing greater flexibility in color achievement. The $SnO_2$ content, relative to the starting substrate is preferably 0.1–2.0% by weight, more preferably 0.5–1.5% by weight. The conditions necessary for this in each case are known to one skilled in the art and can be taken from relevant textbooks.

After precipitations, the coated pigments are separated off, washed, dried preferably at 80° C.–150° C. and calcined preferably at 550° C.–750° C., more preferably 600° C.–750° C. for 30 to 60 minutes in air, for example.

The copper-manganese oxide content, relative to the starting substrate is 2.5–20% by weight, preferably 10–20% by weight and in particular 10–15% by weight.

The copper to manganese ratio can vary widely. Preferably the metal salts are used in a molar ratio of 2:1 to 1:2, particular preference being given to 1:1 mixtures. Outside these values the pigment begins to take on an undesirable brownish tint. Preferred metal salts are halides, nitrates and sulfates, particularly the chlorides, especially $MnCl_2*4\,H_2O$ and $CuCl_2*2\,H_2O$. Especially preferred is a 1:1 ratio using a minimum amount of 3% weight of $CuCl_2*2\,H_2O$ based upon the amount of substrate used as the copper compound salt. Surprisingly, for the 1:2 ratio, the minimum amount of $CuCl_2*2\,H_2O$ is 5% weight based on the amount of substrate used, whereas, it is 10% weight for the 2:1 ratio. One of ordinary skill in the art can routinely determine starting material concentrations and relative amounts of metals therein, for a given, desired product content.

The calcination temperature is preferably higher than 600° C. Temperatures above 750° C. will adversely affect the pigment. A calcination temperature of 500° to 750° C. being a useful embodiment.

It is an unexpected effect that the simultaneous addition of the manganese and titanium compounds dictates the formation of the rutile structure in the $TiO_2$ coating.

The pigment according to the present invention shows a dark gray powder color, an excellent brightness, very clean interference color appearance and a high hiding power. All desired interference colors can be prepared. The dark gray of the powder is advantageous in that it dramatically reduces the appearance of the complement to the interference. The inventive pigment can be mixed with an appropriate white pigment such as a $TiO_2$ pigment, to yield a product similar to aluminum flakes, but also other shades of gray may be achieved. The dark color reduces the need for carbon black addition to darken styling formulations.

The pigment is suitable to at least partially replace metal flakes, particularly, aluminum flakes. The pigment shows weatherability sufficiently high to be employed as a colorant of paint for outdoor use, particularly exterior paint for cars, and its dispersability remains high, with no adverse effect at all upon the color tone and gloss of the base pigment. The pigment may have an addition coating of, for example, hydrated zirconium oxide as in EP-B-0,268,918 (corresponding to U.S. Pat. No. 4,828,623 or EP-A-0,342, 533) or $Al_2O_3/SiO_2$ to enhance weatherability.

The pearlescent pigment according to the present invention can be used not only in paint for outdoor use, but also in many other outdoor materials such as plastics.

Furthermore, the pigment can be used for pigmentation of engobes, glazes, enamels and ceramic materials.

The hiding power of the new pigment is higher than conventional pigments, e.g., silver-white pigments manufactured by E. Merck, Darmstadt.

These properties in connection with the dark gray powder, when the interference is silver, are capable of mimicking the appearance of aluminum flakes giving the new pigments an advantage that no other product has been able to achieve at this point in time.

Without further elaboration, it is believed that one skilled in the art can, using the preceding description, utilize the present invention to its fullest extent. The following preferred specific embodiments are, therefore, to be construed as merely illustrative and not limiting the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents, and publications, cited above and below, are hereby incorporated by reference.

EXAMPLES

Example 1 mica+$TiO_2$ (rutile)+$Cu_xMn_{3-x}O_4$ (x=1.4 or 1.5) 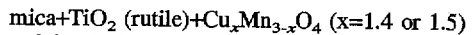

2.2 ml of 60% $SnCl_4$ solution are diluted with 60 ml of 10% HCl. 17.4 g of $MnCl_2*4\,H_2O$ are dissolved in the $TiCl_4$ solution (340 g $TiCl_4$/l $H_2O$) used to coat the mica substrate. The amount of $TiCl_4$ solution depends on the interference color endpoint desired. 100 g of mica (particle size 10–60 μm) in 1.5 l of deionized water are stirred and heated to 75° C. The pH value is adjusted with 10% HCl to pH 1.8. The previously prepared $SnCl_4$ solution is added into the slurry over a period of 45 minutes whereas the pH value is maintained at 1.8 with the simultaneous addition of 20% NaOH solution. The suspension is stirred for 15 minutes at 75° C. and then the pH is raised to 2.2 with 20% NaOH solution. The $TiCl_4$/$MnCl_2*4\,H_2O$ solution is titrated into the slurry keeping the pH at 2.2 with the simultaneous addition of 20% NaOH solution. The $TiCl_4$ addition rate should start at about 10 ml per hour for 15 minutes and then increase at 15-minute intervals to 15 ml per hour, 20 ml per hour, 40 ml per hour, 60 ml per hour and finally to 80 ml per hour to completion. (The yellowish color at this point indicates that the manganese moiety has been incorporated into the hydrous $TiO_2$ matrix.) Once all of the $TiCl_4$/$MnCl_2*4\,H_2O$ solution is added, the slurry is stirred for 15 minutes at 75° C. 15.0 g of $CuCl_2*2\,H_2O$ said are added and the slurry is stirred another 15 minutes The pH value is slowly raised to 9.5 with a 2% $Na_2CO_3$/20% NaOH solution. The suspension is stirred for 0.5 hours at 75° C. The slurry is filtered, washed, dried at 110° C. and calcined at 600° C.–750° C. for 30 minutes in air.

X-ray powder diffraction indicates the presence of the rutile modification of $TiO_2$ and $Cu_xMn_{3-x}O_4$ (x=1.4 or 1.5).

Example 2 mica+$TiO_2$ (anatase)+$Cu_xMn_{3-x}O$ (x=1.4 or 1.5) 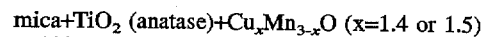

100 g of mica (particle size 10–60 μm) in 1.5 l of deionized water are stirred and heated to 75° C. The pH value is adjusted with 10% HCl to 2.2. The $TiCl_4$ solution (340 g $TiCl_4/H_2O$) is titrated into the slurry in an amount to achieve the desired interference color endpoint. During the addition the pH is maintained at 2.2 with the simultaneous addition of 20% NaOH solution. Once all of the $TiCl_4$ solution is added, the slurry is stirred for 15 minutes at 75° C. 15.0 g of $CuCl_2*2$ $H_2O$ and 17.4 g of $MnCl_2*4$ $H_2O$ were added and the slurry is stirred another 15 minutes. The pH value is slowly raised to 9.5 with a 2% $Na_2CO_3$/20% NaOH solution and stirred for 0.5 h. at 75° C. The slurry is filtered, washed, dried at 110° C. for 16 hours and calcined at 600° C.–700° C. for 30 minutes in air.

X-ray powder diffraction indicates the presence of the anatase modification of $TiO_2$ and $Cu_xMn_{3-x}O_4$ (x=1.4 or 1.5).

Example 3 mica+$TiO_2$+$Cu_xMn_{3-x}O_4$ (x=1.4, 1.5)

100 g of mica (particle size 10–60 μm) in 1.5 l of deionized water are stirred and heated to 75° C. The pH value is adjusted with 10% HCl to 2.2. The $TiCl_4$/$MnCl_2$ *4 $H_2O$ solution (17.4 g of $MnCl_2*4$ $H_2O$ dissolved in the entire amount of $TiCl_4$ solution (340 g $TiCl_4/H_2O$) necessary to obtain the desired interference color endpoint) is added into the slurry keeping the pH at 2.2 with the simultaneous addition of 20% NaOH solution. (The yellowish color at this point indicates that the manganese moiety has been incorporated in the hydrous $TiO_2$ matrix.) Once all of the $TiCl_4$/$MnCl_2*4$ $H_2O$ solution is added, the slurry is stirred another 15 minutes at 75° C. After addition of 15.0 g of $CuCl_2*2$ $H_2O$ the slurry is stirred another 15 minutes. The pH is slowly raised to 9.5 with a 2% $Na_2CO_3$/20% NaOH solution and stirred for 0.5 h at 75° C. The slurry is then filtered, washed, dried at 110° C. for 16 hours and calcined at 600° C.–700° C. for 30 minutes in air. Temperatures between 600° C.–650° C. yield the anatase modification of $TiO_2$ exclusively. A mixed rutile/anatase product is formed at temperatures between 650° C. and 700° C. with the rutile modification being predominate.

The product(s) also display(s) a diffraction pattern indicative of $Cu_xMn_{3-x}O_4$ (x=1.4, or 1.5).

Example 4 mica+$TiO_2$+$Cu_xMn_{3-x}O$ (x=1.4, or 1.5)

100 g of mica (particle size 10–60 μm) in 1.5 l of deionized water are stirred and heated to 75° C. The pH value is adjusted with 10% HCl to 2.2. The $TiCl_4$/$MnCl_2*4$ $H_2O$/$CuCl_2$ solution [(17.4 g of $MnCl_2*4$ $H_2O$ and 15.0 g of $CuCl_2*2$ $H_2O$) dissolved in the entire amount of $TiCl_4$ solution (340 g $TiCl_4/H_2O$) necessary to obtain the desired interference color endpoint] is added into the slurry keeping the pH at 2.2 with the simultaneous addition of 20% NaOH solution. (The yellowish color at this point indicates that the manganese moiety has been incorporated in the hydrous $TiO_2$ matrix. The light blue coloration of the solution shows that the cupric moiety has not.) Once all of the $TiCl_4$/$MnCl_2*4$ $H_2O$/$CuCl_2*2$ $H_2O$ solution is added, the slurry is stirred for 15 minutes at 75° C. The pH value is slowly raised to 9.5 with a 2% $Na_2CO_3$/20% NaOH solution and stirred for 0.5 h at 75° C. The slurry is then filtered, washed, dried at 110° C. for 16 hours and calcined at 600° C.–700° C. for 30 minutes in air. Temperatures between 600° C.–650° C. yield the anatase modification of $TiO_2$ exclusively. A mixed rutile/anatase product is formed at temperatures between 650° C. and 700° C. with the rutile modification being predominate. The product(s) also display(s) diffraction patterns indicative of $Cu_xMn_{3-x}O_4$ (x=1.4, or 1.5).

Color Values

Color values of the inventive pigments with a $Cu_xMn_{3-x}O_4$ (x=1.4, or 1.5) coating on $TiO_2$ (rutile)/mica which pigments possess a dominating dark gray powder color measured according to the Lab-method (DIN 5053) are compiled in dependency of the $TiO_2$ layer thickness in the following table:

TABLE 1

| $TiO_2$ (rutile)/mica + $Cu_xMn_{3-x}O_4$ (x = 1.4, 1.5) | Color values | | | | | | | | |
|---|---|---|---|---|---|---|---|---|---|
| | 45° over black | | | 22.5° over black | | | 45° over white | | |
| | L | a | b | L | a | b | L | a | b |
| silver | 24.54 | −0.57 | −3.09 | 60.00 | −2.40 | −5.21 | 29.74 | −0.83 | −2.10 |
| | 24.76 | −0.66 | −3.02 | 59.90 | −2.44 | −5.08 | 29.27 | −0.84 | −2.18 |
| | 26.26 | −0.86 | −2.62 | 60.14 | −2.39 | −4.08 | 30.71 | −0.98 | −2.11 |
| | 26.40 | −0.96 | −2.68 | 54.36 | −1.12 | −7.04 | 31.06 | −1.05 | −1.83 |
| | 26.51 | −1.02 | −2.69 | 60.09 | −3.01 | 4.68 | 30.88 | −1.04 | −1.81 |
| gold | 19.70 | −1.00 | 5.89 | 53.27 | −2.98 | 14.75 | 26.87 | −1.08 | 2.47 |
| | 19.87 | −1.01 | 5.97 | 52.95 | −2.98 | 14.63 | 27.11 | −1.14 | 2.54 |
| | 21.63 | −1.39 | 6.39 | 50.92 | −2.98 | 14.00 | 26.69 | −1.61 | 4.09 |
| | 22.54 | −1.43 | 8.50 | 53.13 | −3.27 | 17.15 | 28.75 | −1.60 | 5.57 |
| | 22.53 | 1.42 | 8.48 | 53.09 | −3.29 | 17.19 | 28.75 | −1.57 | 5.48 |
| red | 14.97 | 3.73 | −0.24 | 40.72 | 8.23 | 1.99 | 26.70 | 0.35 | 1.37 |
| | 15.01 | 3.76 | −0.21 | 40.75 | 8.21 | 1.98 | 26.63 | 0.31 | 1.37 |
| | 15.07 | 4.04 | 0.28 | 39.83 | 8.13 | 2.80 | 23.16 | 1.14 | 0.34 |
| | 15.66 | 4.97 | 1.50 | 40.16 | 9.14 | 3.18 | 24.63 | 1.03 | 1.36 |
| | 15.68 | 4.97 | 1.51 | 40.06 | 9.11 | 3.24 | 24.77 | 0.96 | 1.37 |
| violet | 13.07 | 5.56 | −7.95 | 37.91 | 11.87 | −14.09 | 25.86 | 1.02 | −1.66 |
| | 13.07 | 5.54 | −7.92 | 37.89 | 11.77 | −13.97 | 27.38 | 0.86 | −1.37 |
| | 11.57 | 6.67 | −8.38 | 34.79 | 12.85 | −14.21 | 18.88 | 2.87 | 4.55 |
| | 12.56 | 8.16 | 10.11 | 35.00 | 14.06 | −16.99 | 24.26 | 1.98 | −3.53 |
| | 12.58 | 8.18 | −10.14 | 35.05 | 14.10 | −17.04 | 24.11 | 2.07 | −3.65 |
| blue | 13.24 | 1.57 | −11.99 | 38.33 | 4.59 | −24.41 | 24.14 | 0.04 | −4.56 |
| | 13.25 | 1.52 | −11.90 | 38.47 | 4.54 | −24.35 | 24.21 | −0.04 | 4.38 |
| | 14.34 | 0.62 | −12.18 | 38.30 | 1.23 | −24.46 | 21.07 | 0.10 | −6.87 |
| | 13.33 | 0.57 | −12.48 | 36.15 | 1.11 | −20.70 | 24.30 | −0.38 | −5.14 |

TABLE 1-continued

Color values

TiO$_2$ (rutile)/mica + Cu$_x$Mn$_{3-x}$O$_4$ (x = 1.4, 1.5)

| | 45° over black | | | 22.5° over black | | | 45° over white | | |
|---|---|---|---|---|---|---|---|---|---|
| | L | a | b | L | a | b | L | a | b |
| | 13.36 | 0.56 | −12.53 | 36.17 | 1.08 | −20.65 | 24.35 | −0.42 | −5.04 |
| blue-green | 15.87 | −3.52 | −4.60 | 45.52 | −8.22 | −10.93 | 26.42 | −2.18 | −1.61 |
| | 15.85 | −3.53 | −4.57 | 45.63 | −8.36 | −10.79 | 26.76 | −2.26 | −1.49 |
| | 15.19 | −2.88 | −5.26 | 41.65 | −8.43 | −7.97 | 24.00 | −1.50 | 0.72 |
| | 15.47 | −4.64 | −5.35 | 40.38 | −8.44 | −9.24 | 26.64 | −2.78 | −1.31 |
| | 15.44 | −4.62 | −5.32 | 40.50 | −8.47 | −9.30 | 26.47 | −2.77 | −1.31 |
| green | 18.81 | −3.92 | −1.14 | 47.38 | −11.10 | 3.15 | 27.72 | −2.52 | 0.47 |
| | 17.72 | −3.86 | −1.18 | 47.41 | −11.10 | 3.14 | 27.57 | −2.52 | 0.44 |
| | 19.68 | −4.73 | 0.26 | 46.63 | −11.64 | 3.18 | 28.36 | −2.77 | 2.97 |
| | 21.33 | −7.44 | 1.04 | 47.94 | −13.76 | 2.17 | 32.82 | −4.35 | 3.21 |
| | 21.42 | −7.52 | 1.06 | 48.04 | −13.87 | 2.13 | 32.50 | −4.54 | 3.19 |

The elemental composition of the inventive pigments with a Cu$_x$Mn$_{3-x}$O$_4$ (x=1.4, or 1.5) coating on TiO$_2$ (rutile)/mica which pigments possess a dominating dark gray powder color are compiled in dependency of the TiO$_2$ layer thickness in the following table:

TABLE 11

Elemental composition:

TiO$_2$ (rutile)/ mica + Cu$_x$Mn$_{3-x}$O$_4$ (x = 1.4, 1.5)

| | % TiO$_2$ | | % SnO$_2$ | | % Cu | | % Mn | |
|---|---|---|---|---|---|---|---|---|
| | exp. | calc. | exp. | calc. | exp. | calc. | exp. | calc. |
| silver | 20.5 | 19.5 | 1.2 | 0.9 | 3.9 | 3.9 | 3.3 | 3.4 |
| | 19.7 | 18.3 | 1.1 | 0.9 | 4.0 | 4.0 | 3.3 | 3.4 |
| gold | 28.1 | 28.1 | 1.0 | 0.8 | 3.4 | 3.5 | 2.9 | 3.0 |
| | 31.0 | 29.6 | 0.9 | 0.8 | 3.3 | 3.4 | 2.8 | 2.9 |
| red | 32.9 | 32.8 | 1.0 | 0.8 | 3.2 | 3.3 | 2.7 | 2.8 |
| | 34.9 | 32.9 | 0.9 | 0.8 | 3.1 | 3.3 | 2.7 | 2.8 |
| violet | 34.9 | 34.2 | 0.9 | 0.8 | 3.2 | 3.2 | 2.7 | 2.8 |
| | 36.7 | 35.1 | 0.8 | 0.8 | 3.0 | 3.2 | 2.6 | 2.7 |
| blue | 37.3 | 38.5 | 0.8 | 0.7 | 2.9 | 3.0 | 2.4 | 2.6 |
| | 40.6 | 38.4 | 0.8 | 0.7 | 2.9 | 3.0 | 2.4 | 2.6 |
| blue-green | 42.3 | 42.4 | 0.7 | 0.7 | 2.8 | 2.8 | 2.3 | 2.4 |
| | 44.5 | 42.4 | 0.7 | 0.7 | 2.7 | 2.8 | 2.3 | 2.4 |
| green | 44.6 | 45.0 | 0.7 | 0.6 | 2.7 | 2.7 | 2.2 | 2.3 |
| | 44.6 | 42.6 | 0.7 | 0.7 | 2.7 | 2.7 | 2.3 | 2.4 |

The hiding power of the inventive pigments with a Cu$_x$Mn$_{3-x}$O$_4$ (x=1.4, 1.5) coating on TiO$_2$ (rutile)/mica which pigments possess a dominating dark gray powder color is compiled in the following table:

| Pigment | Approximate Thickness for Hiding* |
|---|---|
| IRIODIN ® 9103 | 101 μm |
| Violet interference according to present invention | 18 μm |
| Blue-green interference according to present invention | 23 μm |

*Determined as a mass-tone in a CRONA ® 1860J system from DuPont at a concentration of 1 gram of pigment to 10 grams of the 1860J material.

What is claimed is:

1. An interference pigment comprising a platelet-shaped substrate coated with titanium dioxide and a mixed metal oxide of copper and manganese of the formula Cu$_x$Mn$_{3-x}$O$_4$ where x is 1.4 or 1.5.

2. The pigment of claim 1, wherein the mixed metal oxide of copper and manganese is present in an amount of 2.5. to 20 by weight based on the platelet-based substrate.

3. The pigment of claim 1, wherein the copper and manganese in the mixed metal oxide is present in a molar ratio of from 2:1 to 1:2.

4. The pigment of claim 1, wherein the titanium dioxide is in an anatase modification.

5. The pigment of claim 1, wherein the titanium dioxide is in a rutile modification.

6. The pigment of claim 1, wherein the platelet-shaped substrate is mica, synthetic mica, glass flakes, ceramic flakes or pearl luster pigments.

7. The pigment of claim 1, wherein the substrate is SnO$_2$ coated mica.

8. A process for producing interference pigments according to claim 1 comprising forming a mixed metal oxide of copper and manganese on a TiO$_2$ coated platelet-shaped substrate, by simultaneously or in succession adding a water-soluble copper salt and manganese salt to an aqueous suspension of a platelet-shaped substrate while the substrate is being coated with titanium salt or after it has been coated with titanium salt such that the oxide is deposited on the substrate.

9. The process of claim 8, wherein said pigments are calcined at 500° C. to 750° C.

10. A paint, plastic, engobe, glaze, enamel or ceramic material comprising a dark gray powder pigment, wherein the pigment is a pigment according to claim 1.

11. The pigment of claim 1, wherein the platelet-shaped substrate is a synthetic platelet-shaped substrate.

12. The process of claim 8 further comprising separating, washing, drying and calcining in air the substrate after depositing of the oxide.

13. The pigment of claim 1, wherein the pigment has a dark gray color in powder form.

* * * * *